Jan. 7, 1947. M. HALLEAD 2,413,916
PRESSURE OPERATED VALVE DEVICE FOR FILLING CONTAINERS
Filed Feb. 8, 1940 3 Sheets-Sheet 1

INVENTOR.
MERVIL HALLEAD.
BY Allen & Allen
ATTORNEYS.

Jan. 7, 1947.  M. HALLEAD  2,413,916
PRESSURE OPERATED VALVE DEVICE FOR FILLING CONTAINERS
Filed Feb. 8, 1940  3 Sheets-Sheet 2
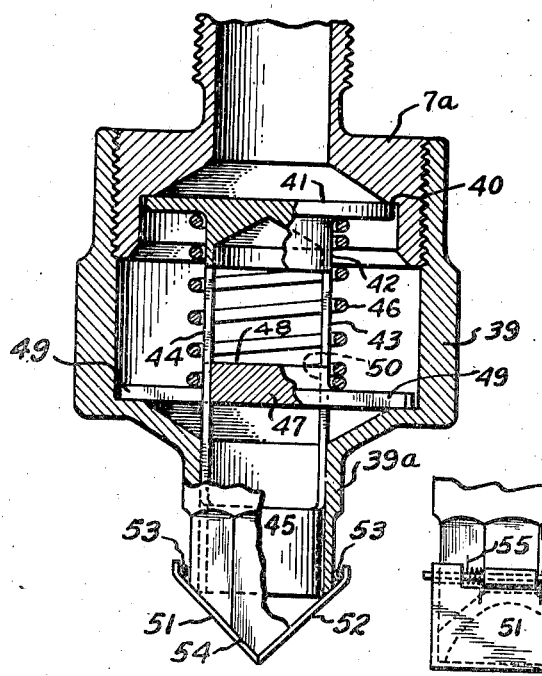
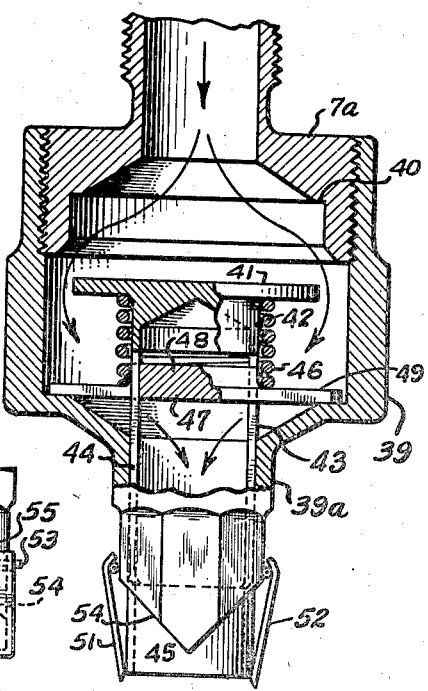
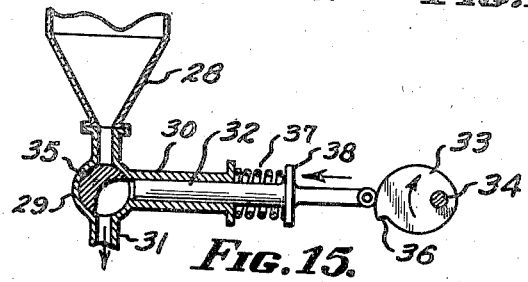
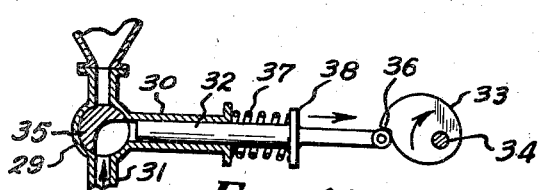
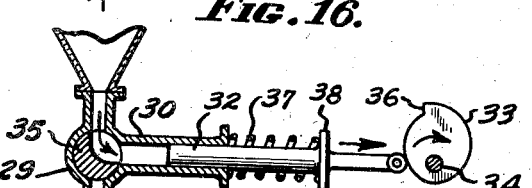
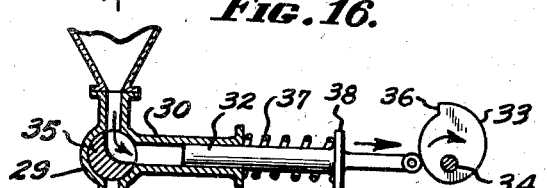
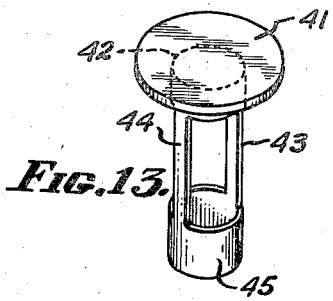
INVENTOR.
MERVIL HALLEAD.
BY
ATTORNEYS.

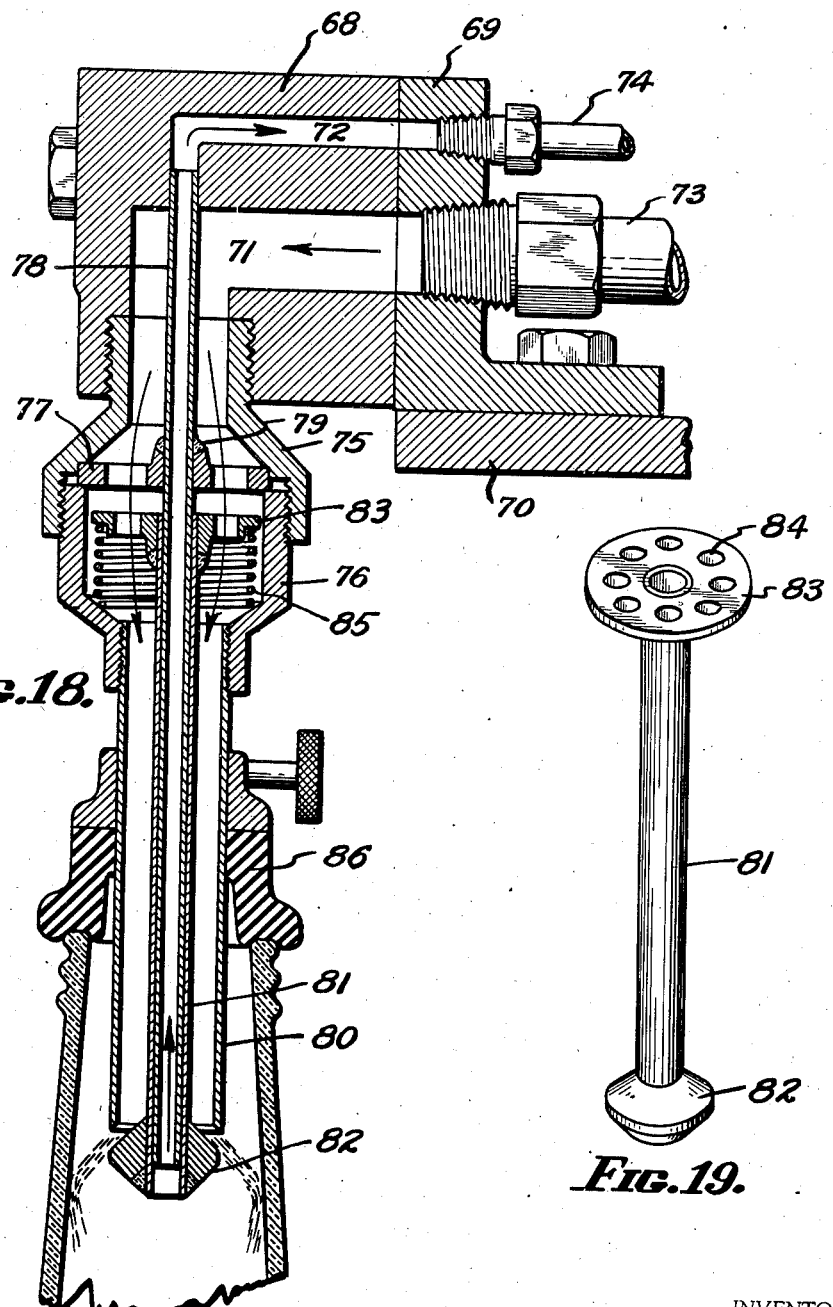

Patented Jan. 7, 1947

2,413,916

UNITED STATES PATENT OFFICE 2,413,916

PRESSURE OPERATED VALVE DEVICE FOR FILLING CONTAINERS

Mervil Hallead, Cincinnati, Ohio, assignor to The Karl Kiefer Machine Company, Cincinnati, Ohio, a corporation of Ohio Application February 8, 1940, Serial No. 317,910

14 Claims. (Cl. 226—112)

My invention relates to the filling of containers. It is especially directed to the matter of control of materials during filling. I shall describe it in connection with the filling of liquids into bottles as one exemplary embodiment, and in connection with the filling of more viscous substances into collapsible tubes as another embodiment; but it will be understood that these embodiments are not the complete measure of utility of the invention and that it is applicable to filling problems in general.

One of the principal objects of my invention is to provide an improved nozzle means for the filling of liquids. In filling machines it is customary to employ a check valve in connection with each nozzle. In order to minimize drip in the intervals between filling operations, it is customary to restrict the opening of the nozzle to the point where the surface tension of the particular material being filled is sufficient to retain in the apparatus the column of liquid between the valve and the nozzle opening. Thus the speed of filling is cut down, and there is a tendency for the material to issue from the nozzle in a small stream at high velocity. This increases turbulence, splashing and foaming, further lengthening the filling time and causing operating difficulties. Since the permissible nozzle opening will vary with the viscosity and surface tension of the substances being filled, the tendency is to provide different nozzles for different liquids, thus increasing the apparatus cost.

As applied to liquid filling, objects of my invention are the provision of means to speed up the filling operation, means to provide a large opening from which the material may issue in a voluminous stream at low velocity, means to control the flow of material, means to minimize turbulence and foaming, and means positively to cut off drip, as well as a simple and inexpensive mechanical construction, and one not requiring a separate check valve.

Another object of the invention has to do with the filling of pastes. When filling pastes of relatively heavy consistencies a large nozzle opening is required to prevent the formation of air pockets. Such large openings hitherto could not be used, however, without encountering stringing. The invention, therefore, contemplates a device for filling pastes and providing a large filling opening so as to avoid air pockets together with automatic means for closing the opening at the conclusion of the filling operation so as to prevent stringing.

Still another object of the invention is the provision of a filling stem containing control mechanism which is sensitive to movement of the material, which movement may or may not be initiated by a filling device more or less remote from the stem, so that the actual filling is made exactly responsive to the movement of the material irrespective of hitherto disturbing factors such as the size of the filling opening of the stem. This exact filling response occurs in my devices even though there may be, in the filling of viscous materials, an appreciable lag in the transmission of movement through the material from the filling device to the stem.

Still another object of my invention is the provision of spout means having the effect of equalizing the flow in the filling of a plurality of containers.

Still another object of my invention is to provide filling means with which the flow, from the spout into the container is controlled so as to avoid splashing, fanning, irregular of misdirected flow, and the fouling of containers. This is of especial importance in connection with the filling of collapsible tubes, which is done with the tube in inverted position, and where the bottom of the tube is sealed by fusion of the ends of the bottom walls. Here it is absolutely essential that the wall portions to be fused be kept absolutely free from filling material, or a good seal cannot be produced.

These and other objects of my invention which will be set forth hereinafter or will be apparent to one skilled in the art upon reading these specifications I accomplish by that certain construction and arrangement of parts of which I shall now describe the aforesaid exemplary embodiments. Reference is made to the drawings which form a part hereof, and in which:

Figure 10 is a sectional view of another filling spout designed for filling collapsible tubes.

Figure 11 is a partial elevational view of the end of the nozzle member showing hinged cut-off and closure means.

Figure 12 is a vertical section similar to Figure 10 but showing the parts in the positions they occupy during actual filling.

Figure 13 is a perspective view of plunger means employed with the device of Figures 10 to 12.

Figure 14 is a perspective view of the spring abutment means of the same device.

Figure 15 is a diagrammatic showing of a piston type measuring device near the conclusion of the filling stroke.

Figure 16 shows the piston at the conclusion of the filling stroke showing the immediate application of suction.

Figure 17 shows the piston near the conclusion of the suction stroke.

Figure 18 is a sectional view of a liquid filling nozzle of improved form.

Figure 19 is a perspective view of a plunger assembly for the device of Figure 18.

In one aspect of my invention, I provide a filling spout in which is incorporated a plunger having two functions; that of acting as a valve for the supply of material to the filling spout, and that of closing off the nozzle of the filling spout at the conclusion of the filling operation, so as to prevent dripping and stringing. In doing so the plunger mechanism acts as a relay to make the actual filling accurately responsive to the movement of material initiated at the source. The plunger is urged to closing position by suitable pressure means, preferably, though not necessarily, mechanical pressure means such as a spring, and preferably adjustable. Hence, in one aspect of my invention when two or more of the filling spouts are used in tandem connected to one source of supply the pressure means on the plungers control the amount of material fed through each filling spout, so that separate and equal measured increments may simultaneously be filled.

Figure 1:
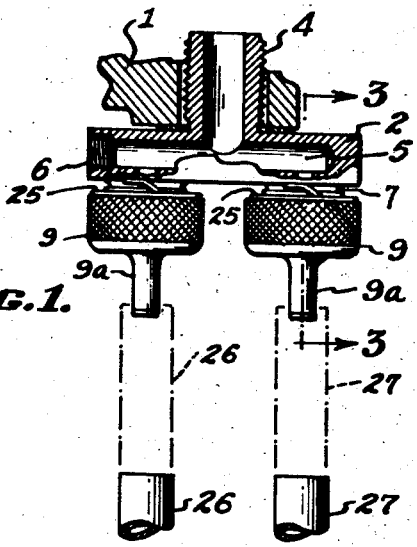
Figure 1 is a side elevational view of an assembly of spouts for filling collapsible tubes, parts of the assembly being shown in section.
Figure 2:
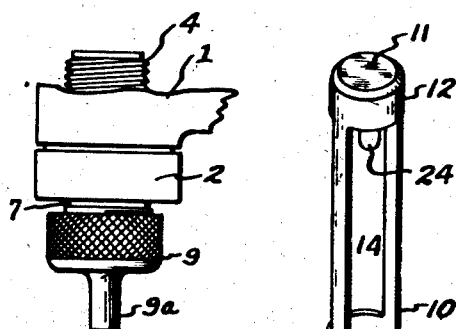
Figure 2 is an end elevation thereof.

In Figure 1, 1 indicates the frame of the filling machine, which in this instance may be thought of as an automatic filling machine for collapsible tubes. The frame supports a filler spout assembly comprising a plurality of filler spouts in tandem. The assembly comprises a body 2 having a perforated supply neck 4 mounted on the frame and connected to a source of supply not shown. The body 2 acts as a manifold for the several filler nozzles, to which end it may be provided with an opening 5 in communication with the opening in the supply neck, and closed at one end by a plug 6. The manifold also has outlet necks 7, each perforated to communicate with the manifold opening 5, and each bearing a nozzle member 9. The necks may conveniently be threaded to engage the nozzles, and the nozzles may comprise an internally threaded collar as shown and a relatively thin perforated spout portion 9a.

Figure 5:
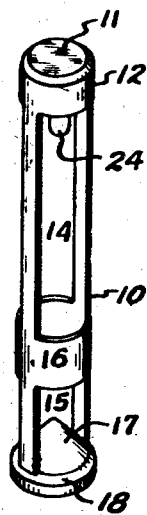
Figure 5 is a perspective view of a control member which I shall hereinafter refer to as a plunger.
Figure 3:
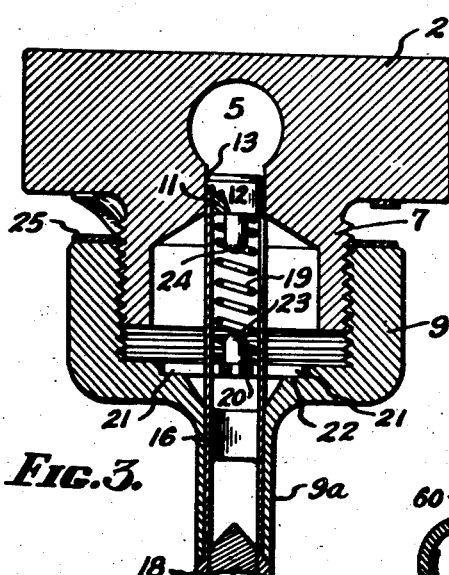
Figure 3 is a vertical elevation taken through one of the spouts and the header along the line 3—3 of Figure 1.

The plungers for each nozzle are illustrated in an exemplary embodiment in Figure 5 and may be made on the basis of a tube 10. The top end of the tube is closed by a plug 11, and this top end forms a head 12, which, entering the perforation 13 in the neck 7 acts as a valve for the supply of material from the manifold to the filling spout proper. Intermediate its length, the tube is cut away as at 14 and 15 in Figure 5. Intermediate the two cut away portions, I prefer to leave a peripherally complete portion 16 which acts as a bearing for the tubular plunger in the bore of the nozzle 9a. At the bottom of the tube, I provide an inner plug 17 and an outer annulus 18, which taken together are cone-shape. This not only directs the flow from the nozzle 9a but also acts as a closure for the end of the nozzle when the plunger is in uppermost position as shown in Figure 3.

It will be noted that in cutting away the tube 10 as at 14 and 15, I leave longitudinally continuous portions of the tube at intervals and preferably at opposite sides. This not only provides a body for the plunger but has an important effect in filling. For example, if the plunger were built on the basis of a central rod the material being forced out through the nozzle would come out in cone shape, and contacting the inner walls of the container, would imprison air therein, which would blow out portions of the material being introduced into the container as the container filled. This might cause considerable loss of material, but in any event would cause splashing and fouling of the upper portions of the container walls, and of the nozzles themselves. The longitudinally continuous portions of the plunger interrupt the cone-shaped jet of material at the lower head 17—18, allowing escape of the air, and permitting rapid, quiet, and uniform filling.

While I have described the plunger as being made on the basis of a tube with head portions welded, brazed, or soldered thereto, it will be evident that the plunger may be otherwise made, as by machining or die casting.

Figure 4:
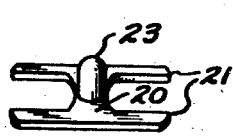
Figure 4 is a perspective view of an abutment member for a control spring.

In order to apply pressure to the plunger, I fit a compression spring 19 within the plunger, and engaging the head or plug 11 at one end and, at the other an abutment means which is on the nozzle member 9. This abutment means is shown in Figure 4. It comprises a body 20, having interspaced legs 21. These legs engage in a recess 22 on the bottom of the threaded collar of the nozzle in such a way that the abutment device extends through the plunger with the body 20 lying inside so that it may serve as an abutment for the spring 19. The body of the abutment means bears a spring retaining and centering pin 23. The plug 11 in the end of the plunger bears a similar pin 24.

In order to permit adjustment of the spring pressure, I provide a spring washer 25 between the threaded cap of the nozzle and the body of the manifold 2. The threaded cap being in engagement with the threaded neck 7 will be moved up or down thereon as the nozzle is rotated, thus adjusting the spring. The retaining washer 25 holds the parts in adjusted position.

In operation, collapsible tubes 26 and 27 are presented to the nozzles in any suitable way, as by being brought to position by holders on a conveyor, and then being raised to occupy the positions shown in dotted lines in Figure 1. It will be understood that the capped ends of the tubes are positioned downwardly in the holders, and that the tubes are filled through their open bottoms, as is common practice. When the filling material is introduced into the manifold 2 under pressure, the plungers of the several nozzles move downwardly against the compression of the springs 19. This opens the supply valve formed by the head 12 and the bore in the manifold at each neck. It will be noted that the movement of the material through the nozzle end of the stem does not begin until the head 12 has moved beyond the end of the bore 13. Thus a large nozzle opening has been provided before the material flows out of the nozzle 9a, resulting in a minimum of turbulence. The turbulence created in the interior of the stem does not create foam (with liquids) or give rise to other difficulties since no air is present at this point. The action of the springs tends to equalize the pressure, so that if the springs are properly adjusted, the flow of material through each nozzle is equal. By this arrangement a single measured increment of filling material may be rateably, and as will usually be desired, equally distributed between several containers. Material flows outwardly in a controlled manner from the nozzle by reason of the plunger construction hereinabove outlined. The filling material flows down and around the plunger, and in the actual nozzle portion, flows through the hollow interior of the plunger. The open-work construction of the abutment means allows the material to flow past it.

At the conclusion of the filling operation, when the pressure on the filling material is relieved, the spring 19 closes the upper valve and also causes the conical head 17—18 to close off the end of the nozzle. This cuts the material if it is pasty, and prevents stringing, and if liquid prevents drip and splashing. While this action occurs automatically upon relief of the pressure of the filling material, it can be made more rapid and more positive, especially with pasty substances by producing a slight immediate suction when the pressure is relieved. In Figures 15 to 17 I have shown diagrammatically an apparatus designed to accomplish this. The material to be fed into the containers is held in a hopper or tank 28 which is connected through a three-way valve 29 to a feed cylinder 30 and also to the filler spouts through a conduit 31. The cylinder has a piston 32 which is operated by a cam 33 on a shaft 34. The shaft is turned in timed sequence to the other operating instrumentalities of the machine, such as means for bringing the containers into position to be filled, means for closing and sealing containers, and so forth. Also the rotary valve member 35 is driven in proper timed relationship with the other devices. Figure 15 shows the position of the parts during the operation of forcing material into the containers. The piston 32 is moving to the left under the influence of the cam, and is emptying the cylinder. At the conclusion of this stroke the cam follower on the end of the piston rides over an abrupt shoulder 36 on the cam as shown in Figure 16. This shoulder is of shallow depth but is sufficient to impart a slight instantaneous motion toward the right to the piston, while the valve member 35 is still in the same position. Next the valve member 35 is rotated to the position shown in Figure 17, so that the cylinder is shut off from the filling spouts and opened to the hopper 28. A continuation of the motion of the piston to the right draws material from the hopper into the cylinder. At the conclusion of this stroke the valve member 35 rotates to the position shown in Figures 15 and 16. In order to cause the piston to follow the cam, I have indicated a compression spring 37 engaged between an abutment on the cylinder and an abutment 38 on the piston; but it will be understood that the showing of these Figures 15 to 17 is diagrammatic, and that equivalents may be employed by the skilled worker in the art for the elements suggested.

In Figures 10 to 12, I have shown a modified form of filler spout, primarily for pasty materials though not limited thereto. A nipple fitting 7a may be thought of as threaded into a manifold, or otherwise attached thereto to form supply means for the spout. A threaded collar 39 engages a threaded portion of the nipple fitting. It carries a nozzle 39a. The nipple fitting is provided with a valve seat 40. The valve member is a head 41 on the upper end of a plunger 42. The plunger is hollow as shown except at the head 41, and the sides of the tubular portion are cut away to leave connecting parts 43 and 44, as before. At the bottom of the plunger there is a complete tubular portion 45 of relatively slight axial extent, lying within and acting as a bearing in the nozzle 39a. The material to be fed into the containers flows into the plunger between the parts 43 and 44, and comes out through the tubular portion 45 and through the nozzle.

Pressure on the plunger is provided by a compression spring 46, in this instance lying external to the tubular portion of the plunger, engaging the head 41 at one end and an abutment means 47 at the other. The abutment means is shown in Figure 14. It comprises a head 48 and interspaced legs 49 which rest on the bottom of the threaded collar 39. The head 48 may be provided with grooves 50 to receive the plunger portions 43 and 44.

In this embodiment of my invention, the plunger does not operate to close off the end of the nozzle. Instead I provide separate cut-off means. These comprise a pair of gates 51 and 52. Each gate is pivoted to the nozzle. One way of accomplishing this is shown in Figure 11 where the pivoting is done by means of a pintle 53 engaging bearing portions both on the gate and on the nozzle. The end of the nozzle is chamfered as at 54 in Figures 10 and 11 so that the gates may come together, closing off the end of the nozzle. When the pressure of filling material forces the plunger downwardly as in Figure 12, the tubular end 45 of the plunger positively opens the gates. The gates may be closed automatically by the action of small springs 55 incorporated in the pivoting means.

In Figure 12 the tube 45 passes completely beyond the lips of the gates 51 and 52 before the material flows through the tube 45. This is due to the length of the bore in which the plunger head 41 rides before permitting passage of material into the stem. If the gates 51 and 52 were used without the retractible tube, they have a tendency to become fouled with the material during filling, and stringing or drip may occur from the gates. In accordance with the invention, however, filling does not start until the tube portion 45 passes beyond the gates so that they remain perfectly clean during filling and at the completion of the filling operation the column of material extending from the tube 45 into the container being filled is attenuated by the retracting of the tube at exactly the same time that the gates are closing on the column. I have found in actual practice that the material does not build up on the gates when this structure is employed, and that very stringy materials can be handled perfectly cleanly. It should be noted that the springs 55 are used primarily only to keep the gates in contact with the tube 45 and the column of material. The principal pressure cutting the column of material results from the retracting of the stem.

Figure 8:
Figure 8 is a sectional view thereof taken along the line 8—8 of Figure 7.
Figure 6:
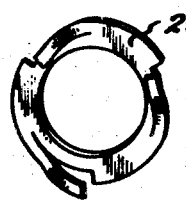
Figure 6 is a perspective view of a retaining washer for a nozzle member.
Figure 9:
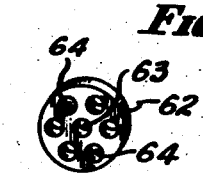
Figure 9 is a sectional view of an upper spacer member.
Figure 7:
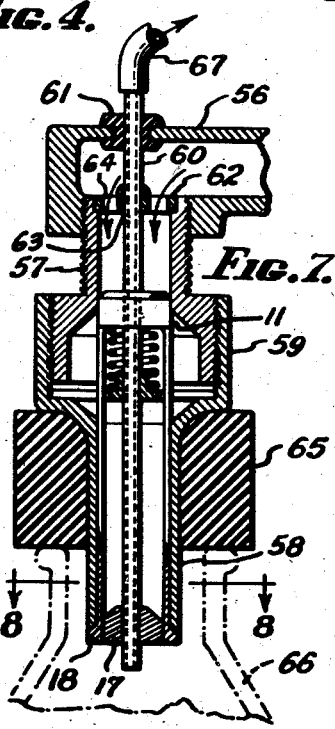
Figure 7 is a vertical sectional view of a modified form of apparatus designed for the vacuum filling of bottles or the like containers.

The principles of my invention may be applied to the vacuum filling of bottles, where it has great advantages. An adaptation of the structure for this purpose is shown in Figures 7, 8 and 9. Supply means for the liquid to be filled into the bottles is indicated at 56. A nipple fitting 57 is screwed into the supply means. The filling nozzle 58 has a screw cap 59 engaging the nipple fitting. The plunger assembly is the same as that indicated in Figures 3 to 5 excepting that the head 11, the abutment means, and the lower conical head 17—18 are perforated for the passage of a small vacuum tube for withdrawing air from the bottles or other containers. The vacuum tube is shown at 60. It passes through the supply member in a suitable gasket 61, and may be centered in a washer shaped centering device 62, held in the top of the nipple fitting 57. The centering device has a central perforation 63 to receive the tube 60, and outlying perforations 64 to permit the filling material to flow from the supply means 56 into the filling spout proper.

The nozzle 58 is made longer in this instance, and bears sealing means 65 which can be brought down onto the neck of a bottle or other container 66 during filling so as to make a sealed joint and permit the container to be exhausted. The tube 60 is connected to a vacuum pump or tank by a conduit 67. When the parts are in the positions shown in Figure 7, a vacuum is produced in the container 66. This causes the filling material to flow through the spout under atmospheric pressure or some fraction thereof. The plunger is depressed and the nozzle opened as hereinabove described. When the vacuum line is closed or when the seal is broken (as by raising the spout or lowering the container), the plunger returns to the position shown in Figure 7, not only closing off the supply of material, but also closing off the end of the nozzle. It is needless to say that the tube 60 should have an accurate fit in the perforations in the plunger heads 11 and 17—18, but not so tight a fit as would prevent axial motion of the plunger.

An improved form of the mechanism is shown in Figures 18 and 19. Here I have shown supporting means 68 fastened by means of a bracket 69 to the head 70 of a filling machine which may be such a filling machine as is shown in Patent No. 1,763,240 in the name of Karl Kiefer, dated June 10, 1930. The supporting means is provided with a supply chamber 71 and a vacuum chamber 72 to which supply and vacum conduits 73 and 74 are connected through the bracket. The suporting means carries the spout mechanism, comprising, among other elements a housing in two parts 75 and 76 which are threaded together. A perforated, disc-shaped holder 77 is held between the two parts. A vacuum tube 78 is fastened to this holder, as by brazing or soldering as at 79. The upper end of the vacuum tube extends through the supply chamber 71 and into the vacuum chamber 72 as shown. The lower end of the vacuum tube extends downwardly through the lower housing portion somewhat beyond the end of a nozzle tube 80 which is threaded into the housing portion 76. The nozzle tube is of a size sufficient to accommodate the volume of liquid to be filled within a short length of time at low velocity. It has an unrestricted lower end opening.

The plunger in this instance embodies a tube 81 which slides over the vacuum tube to provide a bearing for longitudinal movement. At its lower end it bears a cone shaped valve element 82 adapted to make tight contact with the end of the nozzle tube 80 when the plunger is in the uppermost position. At its upper end it may be provided with a disc-shaped head 83. This head may act as a valve against the holder 77, but this is not necessary. The purpose of the head is to open the valve at the lower end of the nozzle in a positive way, and widely. If the pressure of the liquid against the valve part 82 were alone relied upon to open the valve, the tendency would be to increase the velocity of the material issuing from the nozzle, and due to the jet effect, to restrict the nozzle opening. Thus the head should be so shaped as to be acted upon by the moving liquid with enough force to overcome the jet effect and open the valve widely and as soon as the liquid starts to move. The head may be perforated as at 84 to avoid the interposition of too great resistance to the flow of the fluid. A compression spring 85 is placed between the head 83 and the housing portion 76. The nozzle assembly has been illustrated as a vacuum filler device having the sealing means 86.

In operation, as soon as the filling starts, the movement of the liquid drives the plunger downwardly, instantly and widely opening the valve at the bottom of the nozzle tube and keeping it open during the filling operation. Thus the liquid issues from an unrestricted orifice in much greater volume but at much lower velocity. Turbulence and foaming are thus greatly reduced, and the filling time much lessened. The liquid issues from the nozzle tube in a fan-shaped flow, in most instances contacting the walls of the container almost at once and quietly flowing down these walls, still further reducing turbulence. In the specific embodiment shown it is not necessary to break the fan, since the vacuum tube 78 is withdrawing air from beneath the fan. At the conclusion of the filling operation the plunger is driven upwardly by the spring, and the valve at the bottom of the nozzle tube closes, not only preventing drip but rendering unnecessary the use of a separate check valve. The mechanism is simple, easily made, and easily disassembled and cleaned. It is available without change for the filling of materials of a wider viscosity range than has been possible hitherto with a single device. It further shortens the filling cycle by a substantial percentage.

While I have shown the device with a spring 85, I point out that this is not in all instances necessary. The construction of my filling device is one permitting the elimination of the usual check valve. At the conclusion of the filling operation, when the head is raised and the vacuum effect broken, there is in many machines a back-siphoning action sufficient to draw the plunger upward and keep the valve closed at the end of the nozzle.

While I have described my spouts as being particularly useful for operation in tandem, where their function in dividing a supply of filling material into controlled increments is especially valuable, it will be understood that they may be used alone or in the filling of containers one at a time, and as so used have great utility in controlling the filling and preventing drip, stringing, fouling, and loss of material. Furthermore, modifications may be made in my invention without departing from the spirit of it.

Having thus described my invention, what I claim as new and desire to secure by Letters Patent is:

1. In a filling spout, a body comprising a nozzle, and a plunger axially movable in said body, said plunger having a head at one end cooperating with a part of said body providing a valve seat to act as a valve for a supply of material to said spout, and provided at its other end with a head to close off the end of said nozzle, and a spring in said body for urging said plunger to a position in which said valve is closed, said spring being a compression spring and engaging said first mentioned head at one end, and at the other engaging abutment means supported upon a portion of said body, said plunger intermediate said heads being of tubular construction with side portions cut away, said abutment means extending through said plunger, and said spring being located in the hollow interior of said plunger.

2. In a filling spout, a body comprising a nozzle, and a plunger axially movable in said body, said plunger having a head at one end to be acted upon by material flowing through said body, and provided at its other end with a valve to close off the end of said nozzle, and spring means in said body for urging said plunger to a position in which said valve is closed, said plunger between said heads being of hollow tubular form with portions cut away, so that material may enter the hollow interior of said plunger, said last mentioned head being conical in shape, and portions of said plunger adjacent the periphery of said head serving to interrupt the continuity of a cone-shaped jet of filling material issuing from said nozzle whereby to prevent entrapment of air.

3. In a filling spout, a body comprising a nozzle, and a plunger axially movable in said body, said plunger having a head at one end cooperating with a part of said body providing a valve seat to act as a valve for a supply of material to said spout, and provided at its other end with a head to close off the end of said nozzle, and a spring in said body for urging said plunger to a position in which said valve is closed, said spring being a compression spring and engaging said first mentioned head at one end, and at the other engaging abutment means supported upon a portion of said body, said plunger intermediate said heads being of tubular construction with side portions cut away, said abutment means extending through said plunger, and said spring being located in the hollow interior of said plunger, and a vacuum tube extending through said spout, through said plunger and the heads thereon, and through said abutment means.

4. In a filling spout, a body comprising a nozzle, and a plunger axially movable in said body, said plunger having a head at one end cooperating with a part of said body providing a valve seat to act as a valve for a supply of material to said spout, and provided at its other end with a head to close off the end of said nozzle, and a spring in said body for urging said plunger to a position in which said valve is closed, said spring being a compression spring and engaging said first mentioned head at one end, and at the other engaging abutment means supported upon a portion of said body, said plunger intermediate said heads being of tubular construction with side portions cut away, said abutment means extending through said plunger, and said spring being located in the hollow interior of said plunger, said abutment means comprising a head within said plunger and legs attached to said head and resting upon said portion of said body.

5. In a filling device, a source of supply and a plurality of filling spouts simultaneously connectible thereto, each of said filling spouts embodying a pressure actuated valve whereby material from said source of supply may be caused to issue from said spouts simultaneously in volumes proportional to the pressure actuation of said valves, said valves each comprising a plunger with valve means at one end, each of said spouts comprising a nozzle, and each of said plungers comprising means at its other end for closing off said nozzles, means in each spout acting on said valve means for resisting the pressure of said filling material to determine the pressure required to open said valve, and means operable externally of said filling spouts for adjusting said pressure resisting means.

6. In a filling device a filling spout including a body provided with a nozzle, a plunger in said body, said plunger having valve means responsive to pressure of said filling material to cut off a supply of filling material to said spout, and means to close off the end of said nozzle, in combination with a source of filling material, means to supply said material to said spout under pressure at intervals, and means effective at the conclusion of said intervals to apply a momentary suction to said spout.

7. In a filling spout a body including an elongated hollow nozzle, means for closing the end of said nozzle, said means consisting of a cone shaped member adapted in one position to contact and close the end of the nozzle, and in another position to permit the issuance of material from said nozzle past said cone shaped member whereby the material so issuing issues in the form of a cone, and operating means for said cone shaped member comprising at least one member lying along the inside surface of said nozzle member and attached to said cone shaped member, whereby the material issuing from said nozzle in the shape of a cone is caused to have a portion of its surface interrupted, and means for actuating said operating member comprising pressure-actuated valve means located in the path of flow of said material in said body, and connected to said operating means, said body having an elongated orifice within which said valve means slides and which said valve means must leave to come into open position, whereby said cone shaped member is moved well away from the end of said nozzle prior to the feeding of material to said nozzle.

8. In a filling mechanism, a source of filling material, a filling spout, conduit means connecting the source with said spout, and means for controlling the movement of said filling material through said conduit means, said filling spout comprising a hollow casing terminating downwardly in a tubular nozzle of lesser diameter, a plunger mounted for axial sliding movement within said nozzle and casing, said plunger having a hollow tubular body side portions of which are cut away at least adjacent each end of said body, an upper head closing the upper end of said body and acting in connection with a cavity in said casing as a valve for said filling material, a conical head tapering upwardly and closing the lower end of said body, and extending therebeyond to contact and close the end of said nozzle, the said side walls of said body being cut away sufficiently adjacent said conical head to permit the filling material to issue from said nozzle in a conical, downwardly directed jet determined in conformation by the shape of said conical head, a portion of the side walls of said body serving to interrupt said jet at at least one point to prevent air entrapment thereunder, and resilient means for raising said body to cause said conical head to close said nozzle to prevent dripping and stringing, said cavity in said casing being elongated to permit substantial movement of said upper head therein prior to the attainment of valve-open position, whereby pressure of filling material on said upper head moves said lower head to open position prior to the issuance of filling material from said nozzle, to avoid initial squirting.

9. In a filling mechanism, a source of filling material, a filling spout, conduit means connecting the source with said spout, and means for controlling the movement of said filling material through said conduit means, said filling spout comprising a hollow casing terminating downwardly in a tubular nozzle of lesser diameter, a plunger mounted for axial sliding movement within said nozzle and casing, said plunger having a hollow tubular body side portions of which are cut away at least adjacent each end of said body, an upper head closing the upper end of said body and acting in connection with a cavity in said casing as a valve for said filling material, a conical head tapering upwardly and closing the lower end of said body, and extending therebeyond to contact and close the end of said nozzle, the said side walls of said body being cut away sufficiently adjacent said conical head to permit the filling material to issue from said nozzle in a conical, downwardly directed jet determined in conformation by the shape of said conical head, a portion of the side walls of said body serving to interrupt said jet at at least one point to prevent air entrapment thereunder, and resilient means for raising said body to cause said conical head to close said nozzle to prevent dripping and stringing, said cavity in said casing being elongated to permit substantial movement of said upper head therein prior to the attainment of valve-open position, whereby pressure of filling material on said upper head moves said lower head to open position prior to the issuance of filling material from said nozzle, to avoid initial squirting, said resilient means being spring means lying within the tubular body of said plunger, engaging the upper head thereof, and engaging at its lower end abutment means on said casing extending transversely into said tubular body in an area where the side walls of said tubular body are cut away.

10. A filling spout comprising a hollow casing terminating downwardly in a tubular nozzle of lesser diameter, a plunger mounted for axial, sliding movement within said nozzle and casing, said plunger having a hollow tubular body side portions of which are cut away at least adjacent each end of said body, an upper head closing the upper end of said body and acting in connection with a cavity in said casing as a valve for filling material, a conical head tapering upwardly and closing the lower end of said body and extending therebeyond to contact and close the end of said nozzle, the said side walls of said body being cut away sufficiently adjacent said conical head to permit the filling material to issue from said nozzle in a conical, downwardly directed jet determined in conformation by the shape of said conical head, a portion of the side walls of said body serving to interrupt said jet at at least one point to prevent air entrapment thereunder, and resilient means for raising said body to cause said conical head to close said nozzle to prevent dripping and stringing, said cavity in said casing being elongated to permit substantial movement of said upper head therein prior to the attainment of valve-open position, whereby pressure on said upper head moves said lower head to open position prior to the issuance of filling material from said nozzle, to avoid initial squirting.

11. A filling spout comprising a hollow casing terminating downwardly in a tubular nozzle of lesser diameter, a plunger mounted for axial, sliding movement within said nozzle and casing, said plunger having a hollow tubular body side portions of which are cut away at least adjacent each end of said body, an upper head closing the upper end of said body and acting in connection with a cavity in said casing as a valve for filling material, a conical head tapering upwardly and closing the lower end of said body and extending therebeyond to contact and close the end of said nozzle, the said side walls of said body being cut away sufficiently adjacent said conical head to permit the filling material to issue from said nozzle in a conical, downwardly directed jet determined in conformation by the shape of said conical head, a portion of the side walls of said body serving to interrupt said jet at at least one point to prevent air entrapment thereunder, and resilient means for raising said body to cause said conical head to close said nozzle to prevent dripping and stringing, said cavity in said casing being elongated to permit substantial movement of said upper head therein prior to the attainment of valve-open position, whereby pressure on said upper head moves said lower head to open position prior to the issuance of filling material from said nozzle, to avoid initial squirting, said resilient means being spring means lying within the tubular body of said plunger, engaging the upper head thereof, and engaging at its lower end abutment means on said casing extending transversely into said tubular body in an area where the side walls of said tubular body are cut away.

12. A filling spout comprising a hollow casing terminating downwardly in a tubular nozzle of lesser diameter, a plunger mounted for axial, sliding movement within said nozzle and casing, said plunger having a hollow tubular body side portions of which are cut away at least adjacent each end of said body, an upper head closing the upper end of said body and acting in connection with a cavity in said casing as a valve for filling material, a conical head tapering upwardly and closing the lower end of said body and extending therebeyond to contact and close the end of said nozzle, the said side walls of said body being cut away sufficiently adjacent said conical head to permit the filling material to issue from said nozzle in a conical, downwardly directed jet determined in conformation by the shape of said conical head, a portion of the side walls of said body serving to interrupt said jet at at least one point to prevent air entrapment thereunder, and resilient means for raising said body to cause said conical head to close said nozzle to prevent dripping and stringing, said cavity in said casing being elongated to permit substantial movement of said upper head therein prior to the attainment of valve-open position, whereby pressure on said upper head moves said lower head to open position prior to the issuance of filling material from said nozzle, to avoid initial squirting, said resilient means being spring means lying within the tubular body of said plunger, engaging the upper head thereof, and engaging at its lower end abutment means on said casing extending transversely into said tubular body in an area where the side walls of said tubular body are cut away, said casing being in two parts screw-threadedly engaged and adjustable relative to each other, one of said parts having said cavity, the other of said parts supporting said abutment.

13. In a filling spout a body including an elongated hollow nozzle, means for closing the end of said nozzle, said means comprising a cone-shaped member adapted in one position to contact and close the end of the nozzle, and in another position to permit the issuance of material from said nozzle past said cone-shaped member whereby the material so issuing issues in the form of a cone, and operating means for said cone-shaped member comprising at least one member lying along the inside of said nozzle member and attached to said cone-shaped member, whereby the material issuing from said nozzle in the shape of a cone is caused to have a portion of its surface interrupted, and means for actuating said operating means comprising pressure actuated valve means located in the path of flow of said material in said body, and connected to said operating means, a vacuum tube of relatively small diameter passing through said spout and through said valve, said nozzle part bearing a sealing means for engagement with the top of a container.

14. In a filling spout a body including an elongated hollow nozzle, means for closing the end of said nozzle, said means comprising a cone-shaped member adapted in one position to contact and close the end of the nozzle, and in another position to permit the issuance of material from said nozzle past said cone-shaped member whereby the material so issuing issues in the form of a cone, and operating means for said cone-shaped member comprising at least one member lying along the inside of said nozzle member and attached to said cone-shaped member, whereby the material issuing from said nozzle in the shape of a cone is caused to have a portion of its surface interrupted, and means for actuating said operating means comprising pressure actuated valve means located in the path of flow of said material in said body, and connected to said operating means, a vacuum tube of relatively small diameter passing through said spout and through said valve, said nozzle part bearing a sealing means for engagement with the top of a container, said body having a centering means for said tube therein.

MERVIL HALLEAD.